Jan. 18, 1938.   C. F. LOZON   2,105,487
CARBONATING AND DISPENSING RECEPTACLE FOR LIQUIDS
Original Filed Dec. 7, 1934   2 Sheets-Sheet 1

INVENTOR.
CARL F. LOZON
BY
ATTORNEY.

Jan. 18, 1938.   C. F. LOZON   2,105,487
CARBONATING AND DISPENSING RECEPTACLE FOR LIQUIDS
Original Filed Dec. 7, 1934   2 Sheets-Sheet 2
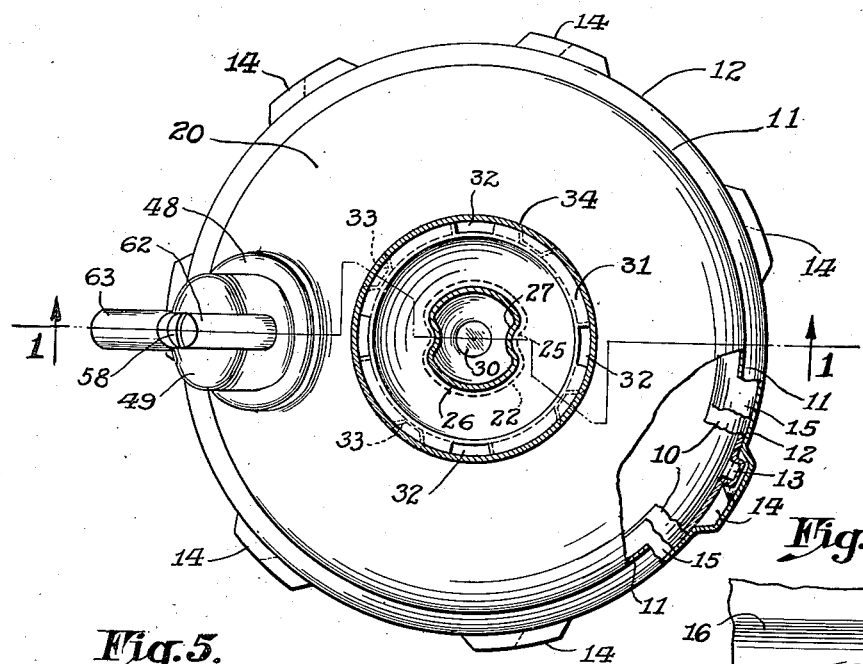
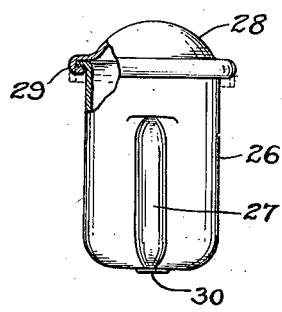
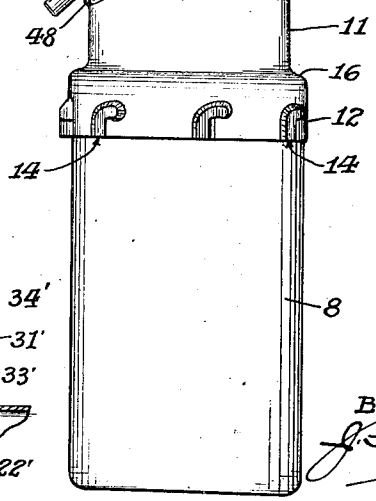
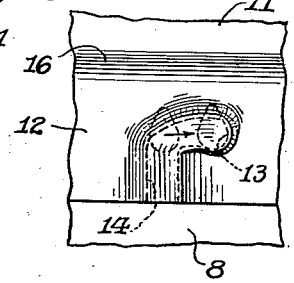
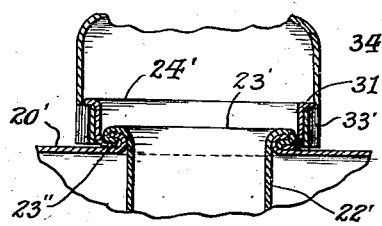
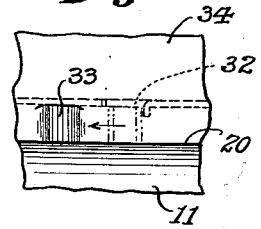
INVENTOR.
CARL F. LOZON
BY
ATTORNEY.

Patented Jan. 18, 1938

2,105,487

UNITED STATES PATENT OFFICE 2,105,487

CARBONATING AND DISPENSING RECEPTACLE FOR LIQUIDS

Carl F. Lozon, Massillon, Ohio

Application December 7, 1934, Serial No. 756,552
Renewed December 11, 1936

18 Claims. (Cl. 225—18)

My invention relates to receptacles for carbonating and dispensing liquids, such as, beverages and carbonated water.

The objects of the invention include the provision of a metallic carbonating receptacle comprising a container portion having a closed bottom and relatively wide open mouth and a top which may be removably secured to the container body to close the relatively wide mouth with the provision of effective sealing means between the top and container to prevent the escapement of the gas.

Another object of the invention is to provide on the top a chamber adapted to receive the capsule containing the gas, such as $CO_2$, for charging or carbonating the liquid, with the provision of means for puncturing the capsule to permit the gas to flow into the container, the said chamber and capsule being provided with cooperating elements or means to prevent relative rotation, and in the preferred form of the invention such means on the capsule also strengthening the same.

Another object of the invention is the provision on the top or closure of a spigot and valve to permit dispensing of the carbonated beverage, the said parts being preferably constructed and arranged to permit escapement of the gas through the valve and spigot if the pressure is too high, and the said parts being also constructed and arranged to afford ready access for the purpose of repair if necessary.

Other objects and advantages of the invention will become apparent and will be specifically referred to during the course of the following detailed description of the accompanying drawings, in which—

Fig. 2 is a view taken on the line 2—2 of Fig. 1 with a part of the cover broken away and a portion of the wall thereof and wall of the container shown in section;

Fig. 3 is a side elevation of a fragment of the cover and container showing the locking means;

Fig. 4 is a view similar to Fig. 3 showing a fragment of the closure for the capsule chamber and cover with means for holding said closure in place on the chamber;

Fig. 5 is a side elevation of a capsule embodying a feature of my invention with a portion thereof broken away and in section;

Fig. 6 is a reduced side elevation of a container such as shown in Fig. 1 with the cover and capsule chamber closure in place; and Fig. 7 is a vertical sectional view through a fragment of a capsule chamber and closure in the portion of the container cover showing a modification and the means for securing the said parts together.

Figure 1:
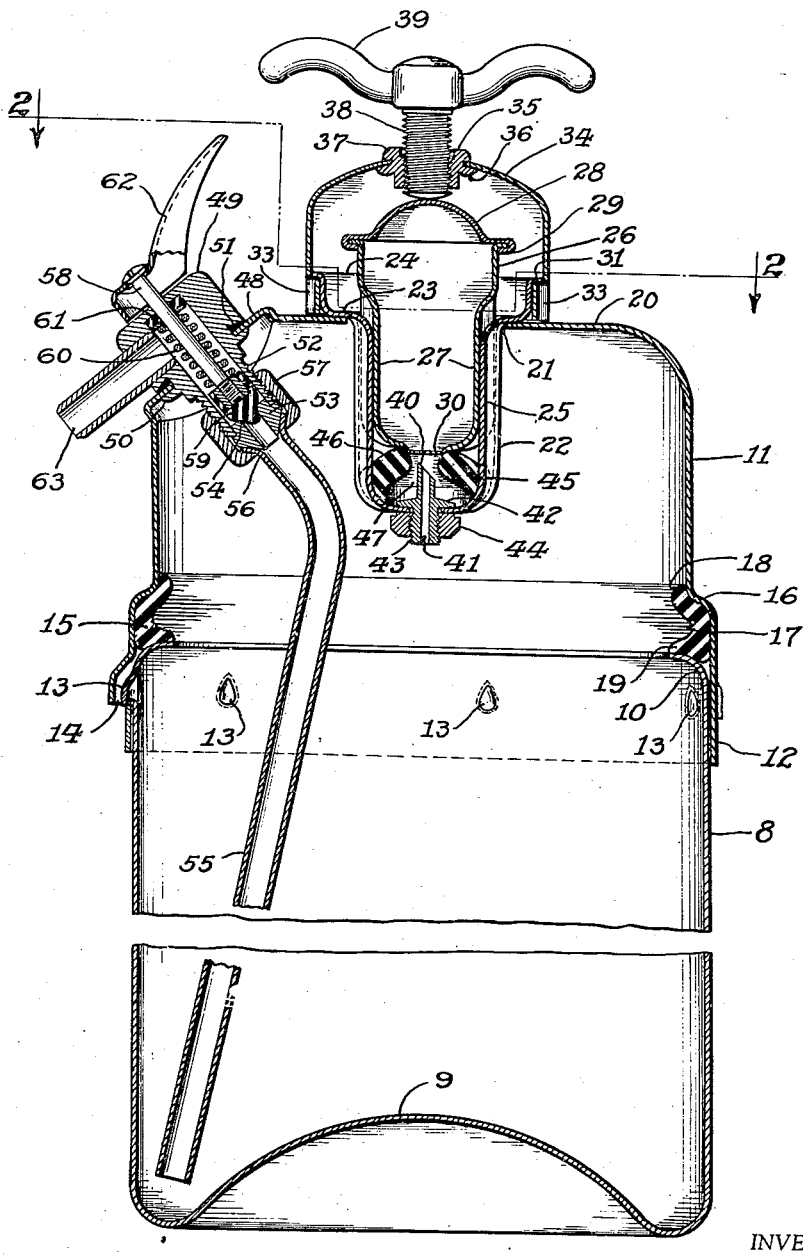
Fig. 1 is a view of a container embodying my invention and taken on the line 1—1 of Fig. 2.

Referring to the drawings, the numeral 8 designates the container body shown as having a dome bottom 9 and inwardly curved flange 10 at its top providing a relatively wide open mouth, whereby the container may be easily filled and cleansed. The cover 11 is of substantially the same width or diameter as the container 8 but is provided with a depending portion or skirt 12 of greater diameter than the container 8 and adapted to telescopically fit over the open end of the container body 8. The wall of the container body 8 just below the flange 10 is provided at spaced intervals with projections 13 which extend outwardly and which may be formed by extruding the metal without rupturing it. This is the preferred manner of forming the projections 13 though I wish to point out that the same may be provided in the form of rivets extending outwardly from the body and rigidly secured thereto in any suitable manner. The purpose of the projections 13 is to engage with the bayonet slots 14 on the skirt portion 12 of the cover 11, which are also preferably formed by extruding the metal sufficiently to permit the upright portion of the bayonet slots to ride down over the projections 13, after which the cover is twisted or turned until the projections 13 rest in the horizontal portions of the bayonet slots, so that the cover is held on the body 8.

To effect the sealing between the cover and the container, I provide a rubber sealing ring or gasket 15 of substantially the same diameter on its exterior as the internal dimension of the skirt 12. The offset portion or shoulder 16 of the cover between the upper wall and the skirt 12 forms part of the seat for the ring or gasket, which is shaped to snugly fit against the offset, as shown clearly in Fig. 1. The ring 15 has a channel 17 between the ends 18 and 19, the former of which extends slightly above the offset portion 16 and the latter of which is curved to engage the curved flange 10 to form a snug fit thereagainst. The ring 15 is normally carried by the cover and the lower end 19 extends down below the position shown in Fig. 1, so that as the cover is applied it is engaged by the flange 10 and forced upwardly, whereby the gasket is tightly compressed in the position shown in Fig. 1. When the pressure is built up within the receptacle, it will force the ends 18 and 19 of the gasket as well as the central portion thereof around the channel 17 tightly against the parts of the receptacle, preventing escapement of the gas between the cover and the container. The top wall 20 of the cover is provided with an opening 21, preferably in the approximate center of the cover to receive the lower part of the capsule chamber which comprises a metallic sleeve or substantially tubular body 22 flaring outwardly at its upper end and provided with a horizontally disposed flange 23 and annular upstanding flange 24 thereabove. The portion 23 rests on the top wall 20 around the opening 21 and is rigidly secured to said margin of the top wall preferably by welding.

As hereinabove mentioned, the lower portion of the capsule chamber, which is the tubular member 22 is preferably so formed as to increase its strength and also to provide means for preventing the capsule from rotating therein. To this end, as shown in Figs. 1 and 2, opposite sides of the member 22 are bent inwardly forming ribs 25 from the lower end of the member 22 to a point adjacent the portion 21. Of course, the bending does not have to be provided exactly on opposite walls nor only in two places as will hereinafter be apparent to the accomplishment of all of the purposes specified.

Referring still to Figs. 1 and 2 of the drawings and also Fig. 5, it will be noticed that the capsule includes the lower portion 26 of substantially the same external dimensions and configuration as the inner dimensions and configuration of the member 22, including grooves or indentations 27 which fit the ridges or ribs 25. The top 28 of the capsule is seamed to the bottom 26 at 29 and the lower end of the capsule is closed by relatively thin wall 30. The rim 31 of the member 22, that is, the lateral flange projecting outwardly from the top of the annular upstanding flange 24 is provided as shown in Figs. 2 and 4 with notches 32 to receive the inwardly bent portions 33 on the lower end of the closure 34 which closes the top or dome of the capsule chamber. Thus when the indentations 33 have passed through the notches 32, the top 34 may be rotated to lock the indentations under the flange 31. A grommet 35 is mounted through an opening in the top 34 substantially in alinement with the longitudinal axis thereof and has a portion 36 curled over on the interior of the top which cooperating with the top flange 37 of the grommet holds the same in place rigidly secured to the top 34. The grommet is screw threaded to receive a pressure screw 38 provided with a handle 39 to facilitate turning thereof. The lower end of the member 22 is provided with an opening which receives the piercing element 40 provided with a central opening 41 communicating with the interior of the container and with the interior of the member 22 in alinement with the thin portion 30 of the capsule. The piercing element 40 has an annular flange 42 engaging the inner surface of the member 22 and a screw threaded stem 43 which receives the nut 44 locking the piercing element to the member 22. A rubber packing ring 45 is disposed in the lower end of the member 22 and has a central opening alined with the portion 30 of the capsule and the piercing element 40.

Obviously, the capsule can be inserted in the chamber or member 22 only with the ridges or ribs 27 engaging the ridges or ribs 25, in which position it cannot be rotated within the chamber or member 22. To the accomplishment of this object, apart from the strengthening of the capsule by the formation of the ribs, any interfitting projections and indentations or the like may be provided at corresponding points on the chamber and capsule. With the capsule inserted as shown in Fig. 1, when the screw 38 is turned in a clockwise direction, the lower end of the screw will eventually engage the top 28 of the capsule, and further turning of the screw in the same direction will force the capsule down, and at the same time forcing the upper tapering end 46 of the gasket or packing 45 down into the space designated by the numeral 47. In other words, forcing the portion 46 of the rubber into tight engagement with the piercing element and also forcing the lower end of the capsule tightly against the rubber, so that no gas may escape when the bulb is punctured by the piercing element 40 passing through the wall 30, except into the interior of the receptacle. During rotation of the screw, the interfitting formations 25 and 27 on the member 22 and capsule prevent relative rotation between said parts.

The structure thus far described accomplishes the carbonating of liquids within the receptacle, and I will now describe the means for dispensing the carbonated liquid from the receptacle.

As shown in Figs. 1 and 2, the top 11 is provided with a boss-like portion 48 having a flat top and a central opening to receive the stem of the valve body 49. The valve body 49 is preferably secured to the portion 48 in the same manner as the grommet 35 is secured to the part 34, that is, by curling a flange 50 against the inner wall of the part 48 with a packing 51 arranged around the opening on the opposite side of the part 48. The valve body 49 is provided with a screw threaded shank 52 disposed on the interior of the receptacle, and receives a valve plug 53 provided with a valve seat 54. A tube 55 extends from adjacent the bottom of the container 8 upwardly and is curved in toward the valve seat 53 and provided with a flared end 56 engaging the lower tapered wall of the plug 53. A nut 57 is slipped over the lower end of the tube 55 and brought upwardly until its threads engage the threads on the stem 52, so that as the nut 57 is tightened up on the threads of the stem 52 it draws the flared end 56 of the tube 55 tightly against the plug 53 and also draws the plug 53 tightly into engagement with the stem 52, as shown in Fig. 1. A valve stem 58 is mounted through the outer end of the body 49 and extends into the bore thereof. The lower end of the stem 58 is screw threaded to receive the valve head 59. A coil spring 60 is compressed between the packing 61 at the top of the body 49 and the valve head 59 normally urging the head 59 into tight engagement with the seat 54. A handle 62 is attached to the outer end of the valve stem and may be rocked on the body 49 to draw the head 59 upwardly against the spring 60 to unseat the head from the valve seat 54, so that the carbonated liquid may flow from the bottom of the container through the tube 55, the bore in the plug 53 which communicates with the bore in the body 49 and then out through the tube 63 which communicates with the last mentioned bore and which may be mounted in the valve body 49 and held therein by any suitable means or may be made a part thereof.

I wish to call attention to the fact that the construction of the dispensing mechanism just described is such that access may be had readily for the purpose of repairing or replacing parts of the valve if necessary. This is due to the fact that when the cover 11 is removed from the body 8, one may readily unscrew the nut 57 to remove the tube 55 and plug 53. Furthermore, the stem 58 may be unscrewed and the head 59 removed therefrom if replacement of the head or spring is necessary. After repair or replacement of any parts, the dispensing mechanism is assembled as above described and as shown in Fig. 1.

It will be noted that the valve 59 opens in the direction of flow of the liquid. In this connection, I wish to point out that the spring 60 is of sufficient strength to hold the valve closed against the pressure normally created within the receptacle in carbonating a predetermined amount of liquid. Should the pressure be excessive the valve 59 will be forced off of the seat 54 against the action of the spring until the pressure is equalized with the strength of the spring. Thus, the valve serves as a safety device.

I deem it unnecessary to make any further detailed description of the operation of the device or the parts thereof, and would only add that though it is not essential to the invention to use any particular type of metal, I prefer to use stainless steel, and in this connection would point out that the construction of the parts as above described is particularly adapted to stainless steel.

I claim:

1. In a receptacle of the character described, a container having an open mouth, a removable closure therefor, means to seal the joint between said closure and container when the closure is applied, a capsule chamber extending through and secured to said closure, a capsule puncturing element at the inner end of the chamber having an opening communicating with the interior of the receptacle, a yieldable packing surrounding said element within the chamber, means to force one end of a capsule against said packing and element, and means on said capsule and the wall of said chamber comprising a longitudinal rib on one and a groove in the other into which said rib fits to prevent relative movement therebetween.

2. In a receptacle of the character described, a container having an open mouth, a removable closure therefor, means to seal the joint between said closure and container when the closure is applied, a capsule chamber mounted in the wall of the closure having a portion disposed on the interior of the closure and a flange on the exterior of the closure, a cover for said capsule chamber, means to connect the capsule chamber cover to said flange, a pressure screw extending through the cover to engage a capsule within the chamber to force the same toward the inner end of said chamber, means at the inner end of the chamber for rupturing the capsule to permit the escapement of gas therefrom into the container, and interfitting means on the capsule and chamber engageable upon insertion of the capsule in a predetermined position to prevent rotation of the capsule within the chamber.

3. In a receptacle of the character described, a container having an open mouth, a removable dome-shaped closure therefor extending above said mouth, said closure having a substantial centrally located opening in its top wall, a capsule chamber mounted through said opening and extending into the interior of the closure, the top of said chamber having a laterally extending flange united to said top wall around said opening to rigidly secure the chamber to the closure, an upstanding flange on the outer periphery of said lateral flange, a cover for the capsule chamber, means on the said upstanding flange and capsule chamber cover engageable to removably hold the parts together against longitudinal movement, a puncturing element at the inner end of the capsule chamber to rupture a capsule, and a pressure screw mounted through the top of the capsule chamber cover to force the capsule against said element.

4. In a liquid carbonating receptacle, a container having a relatively wide open mouth bordered by an inwardly extending flange at the top of the container, a closure telescopically fitting said container to close said mouth and having a shoulder therearound spaced above said flange, a compressible gasket fitting within the closure in contact with the side wall of the closure and contacting said flange and shoulder respectively, said gasket being normally of greater heighth than the distance between said shoulder and flange whereby it is compressed between said flange and shoulder when the closure is applied to seal the receptacle, means to introduce gas into the sealed receptacle, and means to dispense carbonated liquid from the sealed receptacle.

5. In a liquid carbonating receptacle, a container having a relatively wide open mouth bordered by an inwardly extending flange at the top of the container, a closure telescopically fitting said container to close said mouth and having a shoulder therearound spaced above said flange, a substantially U-shaped gasket having one arm engaging said shoulder, its other arm engaging said flange, and its base engaging the side wall of the closure, and being compressed between said shoulder and flange when the cover is applied to seal the receptacle.

6. In a receptacle for carbonating and dispensing liquids, a container having an open mouth, a removable closure therefor, a capsule chamber carried by the closure and communicating into the upper portion of the receptacle, a tube terminating at its lower end adjacent the bottom of the container, a valve body rigidly connected to the closure and having a screw threaded shank on the interior of the closure, a valve seat engaging the inner end of said shank, a nut receiving the upper end of said tube and valve seat and threaded onto said shank to secure said seat and tube to the valve body, the valve body being provided with a bore terminating at said seat and said seat having a bore communicating with said tube, a valve stem mounted longitudinally through the bore of the valve body, a valve head carried by the stem at its inner end, a spring between said valve head and the upper end of said valve body urging the valve head into closed relation with the valve seat, and means connected to the outer end of the valve stem for drawing said valve head away from said seat to establish communication through said bores in the body and seat with the tube and interior of the receptacle.

7. The structure of claim 6 wherein said spring is of a predetermined strength sufficient to hold said valve head closed against the pressure created in the receptacle up to a predetermined degree above which said valve head may be moved by the pressure to compress the spring and open the valve until the pressure is lowered to said predetermined degree.

8. In a receptacle for carbonating and dispensing beverages, a container having a relatively wide open mouth bordered by an inwardly flaring flange, a closure for said container having an enlarged depending skirt portion to telescopically fit the upper portion of the container, said skirt having bayonet slots extruded thereon, projections extruded on the container wall to cooperate with said bayonet slots to removably attach the cover to the container, a gasket of substantially U-shape having one arm engaging said flange and its other arm engaging the shoulder of the skirt portion with its base contacting the wall of said skirt portion, said gasket being compressed in said position between said flange and shoulder when the cover is applied and the projections are engaged in the bayonet slots, means for introducing gas into the container, and means for dispensing carbonated liquid therefrom.

9. In apparatus for effecting carbonation of liquids, a container and a removable closure therefor, means to seal the joint between the container and closure, a capsule chamber carried by the closure, said chamber being of non-circular form in transverse cross section, a capsule to fit within said chamber and being of a transverse cross sectional shape that is complementary to that of the chamber whereby relative rotation or movement between the capsule and chamber is prevented, a capsule piercing element at the inner end of the chamber, rotatable means at the outer end of the chamber to force the capsule against said piercing element, and a gasket around said piercing element engaging the capsule and compressible thereby when the capsule is forced down against the piercing element.

10. In apparatus of the character described for effecting the carbonation of liquids, a container having an open mouth, a removable closure therefor, means to lock said closure on said container and to form a fluid tight joint therebetween, a capsule chamber opening into said container, the walls of said chamber and capsules insertable into said chamber being so formed as to prevent rotation of the capsules relative to the chamber when inserted therein, means at the inner end of the chamber for rupturing the capsules to permit escapement of gas therefrom into the container, and rotatable means for forcing said capsules against said rupturing means.

11. In apparatus of the character described for effecting the carbonation of liquids, a container having an open mouth, a removable closure therefor, means to seal the joint between said closure and the mouth of the container, a capsule chamber carried by the closure and having a portion disposed on the interior of the container when the closure is applied, the walls of said chamber and the capsules insertable thereinto being so formed as to prevent rotation of the capsule within the chamber, means at the bottom of the chamber for rupturing the capsules to permit escapement of gas therefrom into the container, and rotatable means for forcing said capsules against said rupturing means.

12. In apparatus for effecting the carbonation of liquids, a container having an open mouth, a removable closure therefor, a capsule receiving chamber carried by said closure and having a portion disposed on the interior of the container when the closure is applied thereto, interengageable elements on the walls of the capsules and chamber adapted for registry when the capsules are inserted longitudinally within said chamber to prevent relative rotation between the capsules and chamber in reverse directions, means on the inner end of the chamber for rupturing the capsules to permit escapement of gas therefrom into the container, and a screw engageable with said capsules to force them against said rupturing means.

13. In apparatus for effecting the carbonation of liquids, a container having an open mouth, a removable closure therefor, a capsule receiving chamber carried by said closure and having a portion disposed on the interior of the container when the closure is applied thereto, interengageable elements on the walls of the capsules and chamber adapted for registry when the capsules are inserted longitudinally within said chamber to prevent relative rotation between the capsules and chamber in reverse directions, means at the inner end of the chamber for rupturing one end of the capsules to permit escapement of gas therefrom into the container, rotatable means for forcing said capsules against said rupturing means, said capsules and chamber being of such relative lengths that the other ends of the capsules are exposed to permit grasping thereof for removal after said first ends have been ruptured and the liquid has been carbonated.

14. In apparatus for effecting the carbonation of liquids, a capsule containing a charge of compressed gas and consisting of a closed hollow body, a peripheral flange adjacent one end and a longitudinal groove in its side wall extending from the opposite end toward said flange.

15. In apparatus for effecting the carbonation of liquids, a capsule containing a charge of compressed gas and consisting of a closed hollow body, a peripheral flange adjacent one end, the opposite end being substantially dome-shaped and provided with a central frangible portion, and the side wall of the body having a plurality of longitudinal grooves extending from said dome-shaped end toward said flange.

16. In apparatus for effecting the carbonation of liquids, the combination of a capsule holder, a hollow piercing device, a capsule containing a charge of compressed gas and consisting of a hollow body having an external groove in its side wall, and said holder having a projection therein which cooperates with said groove to hold said capsule in its proper position relative to said piercing device.

17. In apparatus for effecting the carbonation of liquids, the combination of a capsule holder, a hollow piercing device, a capsule containing a charge of compressed gas and consisting of a hollow body having a plurality of external grooves in its side wall, and said holder having projections therein which cooperate with said grooves to hold said capsule in its proper position relative to said piercing device.

18. In apparatus for effecting the carbonation of liquids, the combination of a capsule holder, a hollow piercing device, a capsule containing a charge of compressed gas and consisting of a hollow body having a frangible portion at one end and an external groove in its side wall, and said holder having a projection therein which cooperates with said groove to hold said frangible portion in its proper position to be pierced by said piercing device.

CARL F. LOZON.